(12) United States Patent
Gendlin et al.

(10) Patent No.: US 8,673,103 B2
(45) Date of Patent: Mar. 18, 2014

(54) METHOD OF FABRICATING AN ARMOR PANEL

(75) Inventors: Vladimir Gendlin, Warren, MI (US); Douglas A. Stanczak, Shelby Township, MI (US); Donald T. Ostberg, Sterling Heights, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 209 days.

(21) Appl. No.: 13/365,821

(22) Filed: Feb. 3, 2012

(65) Prior Publication Data
US 2013/0199712 A1    Aug. 8, 2013

(51) Int. Cl.
*B32B 38/10*    (2006.01)

(52) U.S. Cl.
USPC ......................................................... 156/247

(58) Field of Classification Search
USPC ......................................................... 156/247
See application file for complete search history.

(56) References Cited

U.S. PATENT DOCUMENTS

| | | | |
|---|---|---|---|
| 3,177,273 A | 4/1965 | Fingerhut et al. | |
| 3,177,568 A | 4/1965 | Schweiker | |
| 3,254,417 A | 6/1966 | Carmichael, Sr. | |
| 3,463,695 A | 8/1969 | Schweiker et al. | |
| 4,307,140 A * | 12/1981 | Davis | 428/86 |
| 5,195,046 A | 3/1993 | Gerardi et al. | |
| 6,532,857 B1 | 3/2003 | Shih et al. | |
| 6,826,996 B2 | 12/2004 | Strait | |
| 2007/0017359 A1 | 1/2007 | Gamache et al. | |
| 2009/0269552 A1 | 10/2009 | Foldager | |
| 2010/0043630 A1 | 2/2010 | Sayre et al. | |
| 2011/0094087 A1 | 4/2011 | Tiirola | |

OTHER PUBLICATIONS

T. Meitzler, I. Wong, D. Bryk, T. Reynolds and S. Ebenstein, Damage Detection in Composite Plate Armor Using Ultrasonic Techniques (U), US Army RDECOM-TARDEC, Warren, MI 48397.

* cited by examiner

*Primary Examiner* — Philip Tucker
*Assistant Examiner* — Vicki Wu
(74) *Attorney, Agent, or Firm* — David L. Kuhn; Thomas W. Saur; Luis Miguel Acosta

(57) ABSTRACT

A fabricating method for an armor panel uses a template to position tiles on an adhesive surface. The template includes an L-shaped frame and cells having precise wall thickness. Tiles are fitted in the cells against the surface. The template is repeatedly repositioned so new tiles can be fitted into unoccupied cells to form a desired tile array. A border is placed around the array, forming a cavity. Resin is poured into the cavity. A back plate placed over the array presses against the resin. Excess resin exits the cavity through an interface between the border and the adhesive surface and through a gap between the back plate and border. After the resin cures the border is removed.

10 Claims, 3 Drawing Sheets

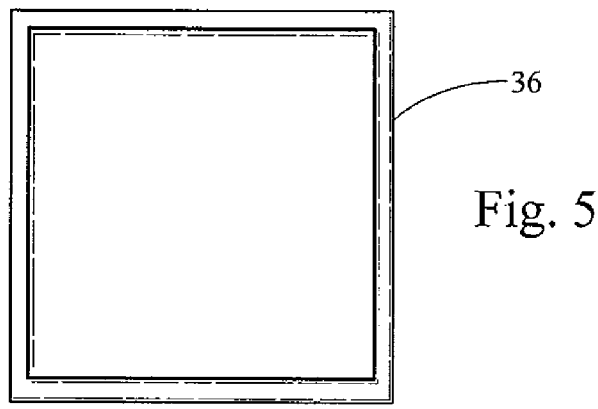
Fig. 5
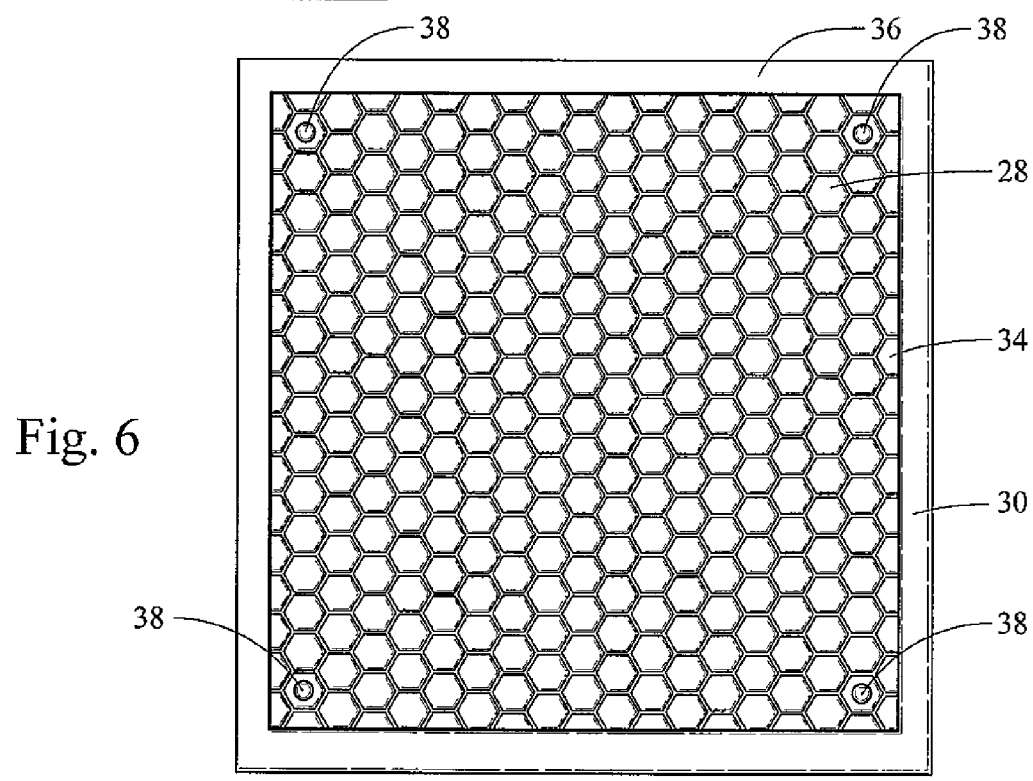
Fig. 6
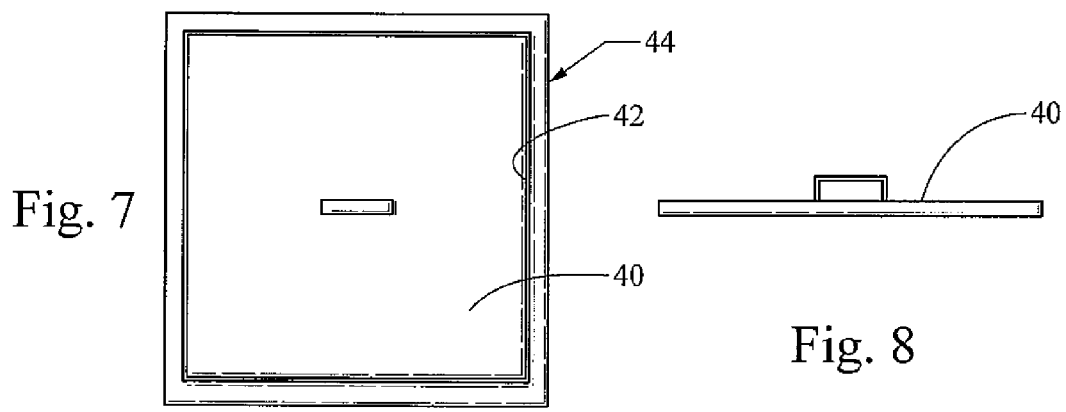
Fig. 7
Fig. 8

METHOD OF FABRICATING AN ARMOR PANEL

GOVERNMENT INTEREST

The invention described here may be made, used and licensed by and for the U.S. Government for governmental purposes without paying royalty to me.

BACKGROUND OF THE INVENTION

1. Field of the Invention

The present invention generally relates to the manufacture of composite armor panels having ceramic tiles embedded therein.

2. Background Art

A relevant item of prior art is U.S. Pat. No. 3,463,695 to Schweiker et al. Schweiker shows the use of an adhesive sheet to temporarily hold ceramic tiles in place. Schweiker uses a template to position the tiles so that they will be in fixed relation to each other on the adhesive sheet. The template is removed once the tiles are adhered to the adhesive sheet. The template is an array of cells closed at the bottom so as to form a tray much like an ice cube tray. However a cell-array template open at both the top and bottom is shown by U.S. Pat. No. 3,254,417 to Carmichael. Placing an assembled array of armor tiles or ceramic armor elements in a cavity and then filling the cavity with resin is shown, for example by U.S. Pat. No. 6,532,857 to Shih, U.S. Pat. No. 4,307,140 to Davis, Published Patent Application 2009/0269552 to Foldager, and U.S. Pat. No. 6,826,996 to Strait. Note that Foldager shows spacing the back plate from the tiles prior to introduction of resin into the cavity or mold where the tile array is placed. Using an edge of a rectangular template and projections thereon to align the template with a straight edge formed by already-laid floor tiles is shown by the Carmichael reference above.

SUMMARY OF THE INVENTION

The invention is a method of fabricating an armor panel with ceramic tiles embedded in the panel. An adhesive sheet or film is used to secure the ceramic tiles on a flat surface. Before placing the tiles on the sheet a template is placed on the sheet to control tile placement. The template is an array of hexagonal shaped cells open at the top and bottom, the cells accommodating hexagonal tiles closely fitting therein and adhering to the sheet. Once the tiles are placed, the template is removed and a border is placed around the assembly of tiles to form a cavity to contain resin, and then resin is poured into the cavity. The resin fills the gaps between the tiles. A back plate is set over the assembly of tiles. Spacers are used to control the width of the gap between the back plate and the tiles. The resin fills the gap between the back plate and the tiles and the resin is cured.

BRIEF DESCRIPTION OF THE DRAWINGS

FIG. 5 shows a border used to surround the tiles and FIG. 6 shows the border as placed around the tiles.

FIG. 7 shows a back plate disposed over the tiles and forming a gap with the border.

FIG. 8 shows a side view of the back plate.

DETAILED DESCRIPTION OF THE PREFERRED EMBODIMENT(S)

Definitions and Terminology:

The following definitions and terminology are applied as understood by one skilled in the appropriate art.

The singular forms such as "a," "an," and "the" include plural references unless the context clearly indicates otherwise. For example, reference to "a material" includes reference to one or more of such materials, and "an element" includes reference to one or more of such elements.

As used herein, "substantial" and "about", when used in reference to a quantity or amount of a material, dimension, characteristic, parameter, and the like, refer to an amount that is sufficient to provide an effect that the material or characteristic was intended to provide as understood by one skilled in the art. The amount of variation generally depends on the specific implementation. Similarly, "substantially free of" or the like refers to the lack of an identified composition, characteristic, or property. Particularly, assemblies that are identified as being "substantially free of" are either completely absent of the characteristic, or the characteristic is present only in values which are small enough that no meaningful effect on the desired results is generated.

Concentrations, values, dimensions, amounts, and other quantitative data may be presented herein in a range format. One skilled in the art will understand that such range format is used for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 dimensional unit to about 100 dimensional units should be interpreted to include not only the explicitly recited limits, but also to include individual sizes such as 2 dimensional units, 3 dimensional units, 10 dimensional units, and the like; and sub-ranges such as 10 dimensional units to 50 dimensional units, 20 dimensional units to 100 dimensional units, and the like.

Figure 1:
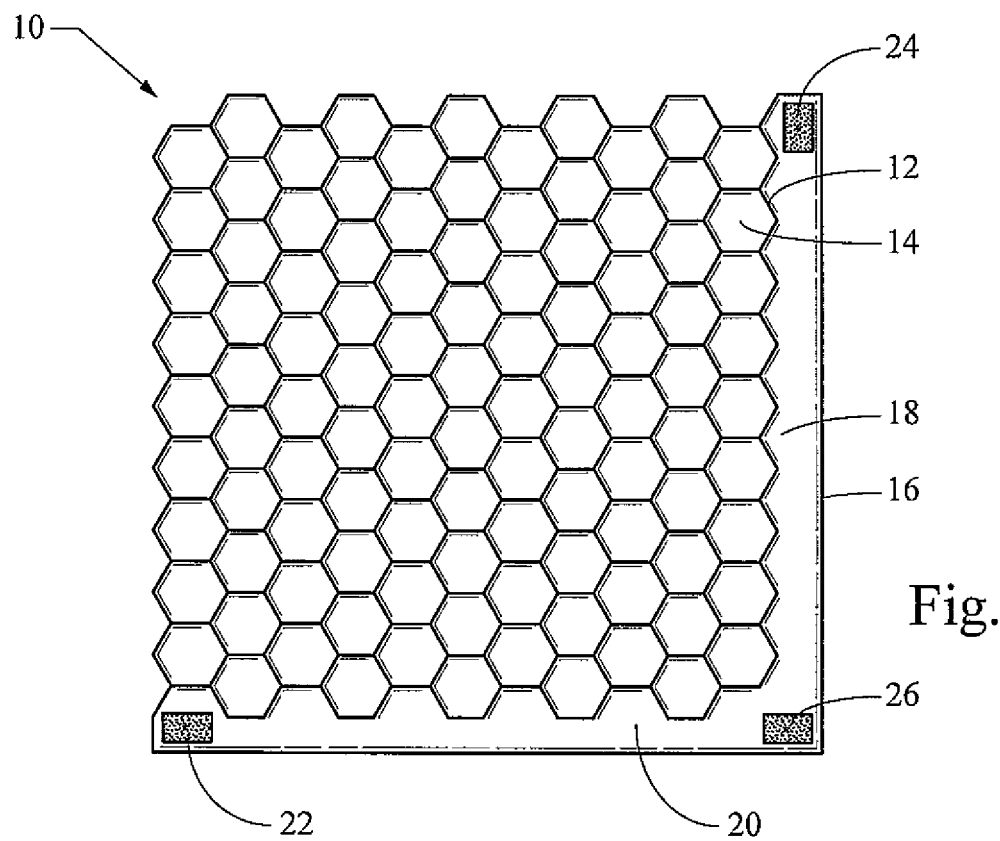
FIG. 1 shows a tile placement template used in our method of fabricating an armor panel.

In FIG. 1 is shown a template 10 which is used in our method of fabricating armor panels. The purpose of the template is to place tiles in a planar array in very precise juxtaposition such that the spaces between tiles are exact and consistent; the precise juxtaposition of the tiles is an important factor in facilitating predictable ultrasonic wave propagation during non destructive testing of the finished armor panel. The template includes thin-walled cells, as at 12, which define pockets or openings 14 into which ceramic tiles are inserted. The cells shown in FIG. 1 are hexagonal in shape but the cells can have any other regular polygonal shapes, such as squares or octagons, for example. Cells 12 are in a compact arrangement wherein no interstitial spaces exist among the cells. Typical cell wall thickness in template 10 for our applications were in the range from 0.0020 to 0.0070 inches, but this range can vary, depending on the overall design of the finished armor panel and the desired ballistic traits of the panel. In order to facilitate ultrasonic nondestructive testing, it is preferred in our applications that the cell walls' thickness is precise and essentially constant, and that wall thickness thus preferably varies by 0.0001 inch or less. There are numerous methods by which template can be fabricated with the desired accuracy of dimensions; in our application the template was made of aluminum and was machined via a water jet process.

Template 10 includes a generally L-shaped frame 16 which has two connected legs 18 and 20 perpendicular to each other. The frame borders only two sides of the array of cells 12. The remaining sides of the array of cells have no frame legs or members joined to them so that there are exposed cells along two edges of the template. One function of frame 16 is simply to stiffen the array of cells, which, due to their thin walls, can otherwise distort or parallelogram during usage. Frame 16 also prevents the array of cells from bending out of plane, so that the array maintains flatness. Preferably, on the legs are pads 22, 24 and 26 which are of uniform thickness and which space template 10 from an engagement surface on which it is laid. The pads can be of various materials, and in our application Velcro® strips were used. It may be preferred that the pad have bumps or bristles on the side facing upon the engagement surface since that surface in our method has an adhesive face. The bumps or bristles minimize the template's contact with the engagement surface to facilitate the template's removal from the engagement surface after the template has been used to place tiles.

Figure 2:
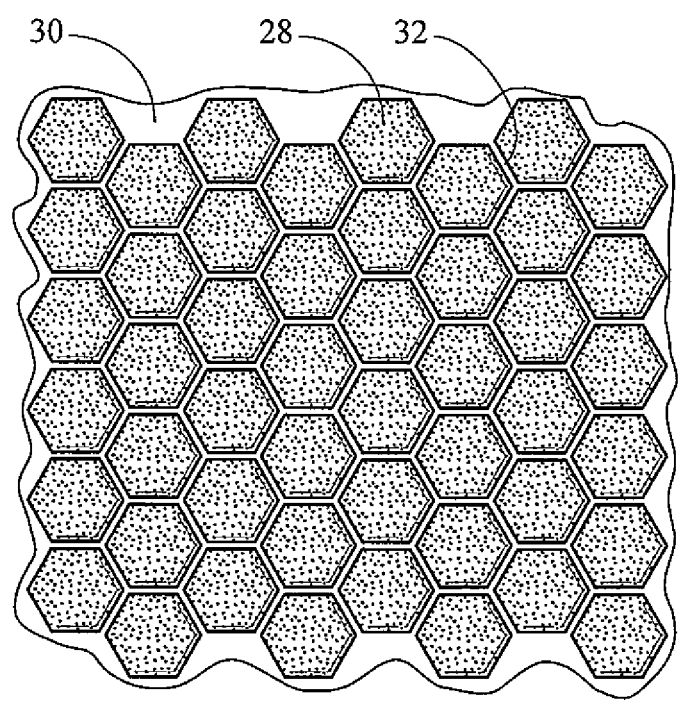
FIG. 2 shows an array of tiles positioned on a sheet by using the template in FIG. 1.

FIG. 2 shows an array of ceramic tiles 28 that have been positioned using template 10. The tiles rest on an engagement element such as sheet 30, which has an adhesive face on which the ties lie. Spaces between the tiles, as at 32, are relatively thin and are quite uniform in thickness. Sheet 30 can be a flexible sheet or in the alternate can be a solid metal panel having sufficient thickness and strength to afford a degree of ballistic protection. The array of tiles in FIG. 2 is an illustrative example only. The array can have a greater number of tiles than shown in FIG. 2 and can have a different overall shape from the generally rectangular shape shown in that figure. The general shape can be that of a different rectangle, a trapezoid, or a circle, for example. The array is formed by first placing template 10 on sheet 30 and then the tiles are placed in the pockets 14 of the template. Tiles 28 fit closely within pockets 14.

Sheet 30 or the work surface upon which it is laid preferably has a high degree of flatness so that the larger, opposed faces of the tiles (the hexagonal faces in FIG. 2) are flat and precisely coplanar, one set of the faces being in a first facial plane parallel with a second facial plane containing the other set of faces. The sides of tiles 28 are precisely perpendicular to the opposed faces. An available measure of flatness that can be used is Federal Specification GGG-P463c, Category A—Inspection Grade, and it is possible that Category B of that specification will also suffice. A greater degree of flatness in sheet 30 and the resulting greater precision in positioning tiles 30 creates a greater precision and consistency in the width of spaces 32. Hence, the width of any space 32 will not vary with distance from one of the facial planes. It is believed the greater consistency in width facilitates non destructive testing of finished armor panels via the use of ultrasonic wave propagation. Such a method for non destructive testing is not part of our invention but an armor panel constructed according to our invention can be non destructively tested by this kind of method.

There are numerous references concerning acoustic non destructive testing of manufactured articles. For example, see U.S. Pat. No. 5,195,046 to Girardi et al. The method of nondestructive testing that we prefer is similar to that shown and discussed in the article "Damage Detection in Composite Plate Armor Using Ultrasonic Techniques" by Meitzler et al released August 17, 2009 and available on line at http://oai.dtic.mil. There is one difference between the method of the Meitzler article and the non destructive testing of a panel made by our method. Our finished composite armor panel has defined spaces or gaps between ceramic tiles, and the spaces or gaps are filled with an elastomeric polyurethane resin. The portions of the resin between the tiles are sufficiently thick to absorb shock imparted to and emanating from one ceramic tile so that the shock does not affect neighboring tiles. The aforementioned article contemplates essentially no space between ceramic tiles; there can be a very thin adhesive coating between the tiles but the tiles are pressed together as tightly as possible.

We have discovered that an ultrasonic wave or signal can be propagated through at least approximately six feet though a panel structure made according to our method, where there are, thin, uniform spaces between tiles. An ultrasonic transducer in or on our structure thus can send ultrasonic waves or signals to another ultrasonic transducer several feet away in or on the same structure. The signals or waves arriving at the receiving transducer can be used to determine whether tiles in the structure have been damaged. The precision in the width of the elastomeric polyurethane resin portions between the tiles contributes to the consistency in the way waves or signals propagate through our structure. This consistency of propagation causes greater fidelity (lower signal-to-noise ratio and fewer false readings) in the waves or signals experienced by the receiving transducer.

Figure 3:
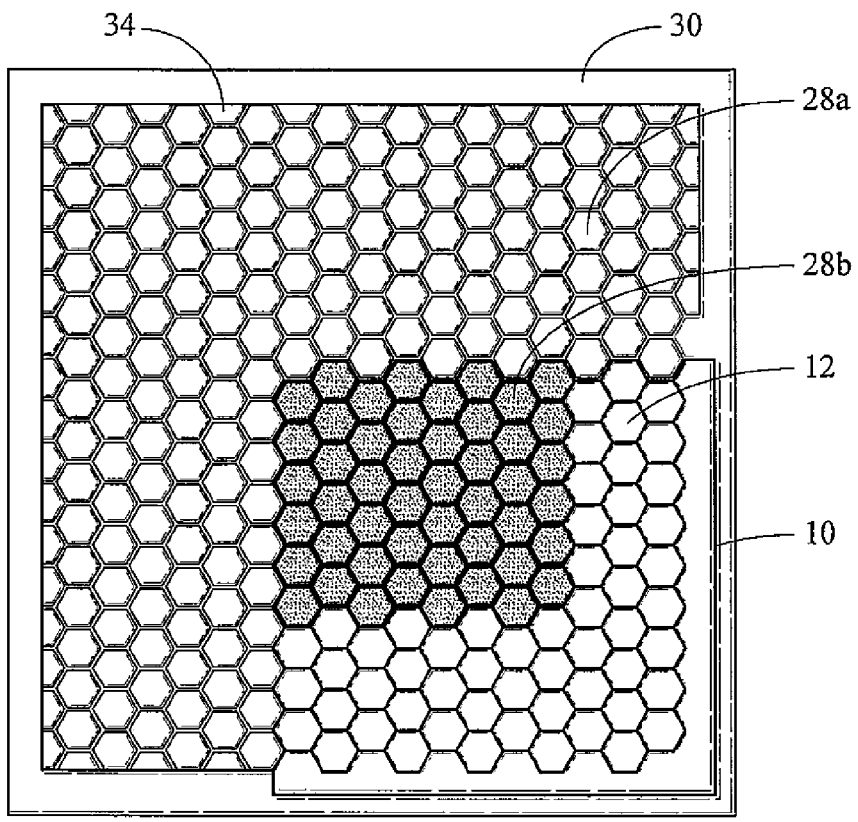
FIG. 3 shows the template engaging tiles that have been pre-positioned, there being empty pockets or cells in the template to allow placement of additional tiles.

FIG. 3 illustrates a situation where some, but not all, of the tiles have been placed on sheet 10 to form a generally rectangular array. Some of the tiles, ones that are already placed, are shown with dashed lines, as at 28a; tiles 28a are not surrounded by cells of template 10. Other tiles that have been placed on sheet 10 are shown in a partly graphically filled-in (not shaded) fashion, as at 28b; tiles 28b are surrounded by cell walls of template 10. Cells 12 of template 10 not occupied by tiles 28b are empty. Due to the precise fit of template 10 with tiles 28b, tiles placed in the unoccupied cells will be precisely juxtaposed with tiles 28a, tiles 28b and with each other. Part of our method in fabricating an armor panel is to place template 10 on already-positioned tiles 28b in a manner similar to that shown in FIG. 3 and then to place other tiles in the unoccupied cells. This portion of our method can be repeated numerous times and with different sets of already-positioned tiles to create a final array of precisely aligned tiles of any desired size and shape. It is possible for this portion of our method to place template 10 only on one or two propositioned tiles 28b and then place other tiles in the unoccupied cells; likewise it is possible to fit one edge of template 10 against a line of pre-positioned tiles. However, to assure the desired accuracy in array-wide tile placement, it is preferred to place template 10 over at least several (say, six or more) already-positioned tiles 28b in this portion of our method so that the tiles are surrounded by walls of cells 12.

Figure 4:
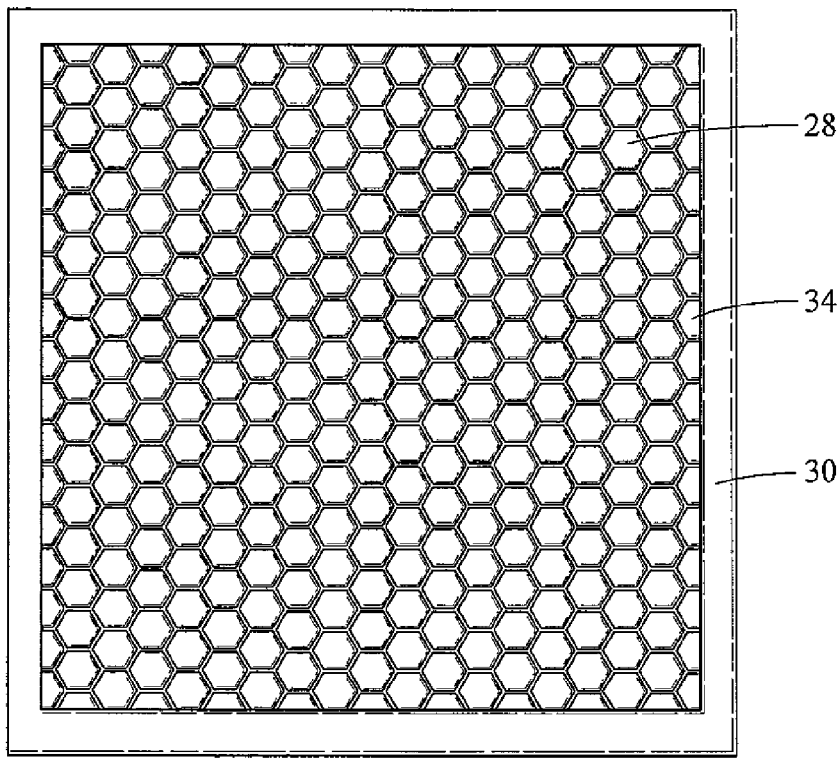
FIG. 4 shows a completed array of tiles positioned according to our method.

It will be noted that there are bisected tile portions 34 at the edges of the tile array shown in FIG. 3. Tile portions 34 may be regarded as half sections of tiles 28. These portions can be placed in template 10 to fit against three contiguous walls of any cell 12 so that the tile portions are in precise alignment with tiles 28 in the tile array and form straight edges along the borders of the array. FIG. 4 shows an example of a complete array of tiles positioned in accordance with our method.

After the complete array of tiles is placed on sheet 10, a border 36 is placed on sheet 10 around the array. As shown in FIG. 5, border 36 is essentially a rectangular frame, much like a window frame, the border being shown in heavier lines in FIG. 6 in its position surrounding the array of tiles. Border 36 has a depth greater than the height of tiles 28, so that the array of tiles as seen in FIG. 6 is recessed with respect to the border. The border preferably fits closely with the array of tiles and has preferably has a lesser degree of flatness than does sheet 10, so that a controlled seepage of polyurethane resin can occur at the interface between border 36 and sheet 10 during a later step in our process. The border and sheet form a mold cavity into which polyurethane resin will be poured.

Spacers 38 are placed on top of the array of tiles, typically at or near corners of the array. The spacers are of a plastic material chemically similar to the aforementioned resin so that the spacers will not react differently from the resin to ultrasonic waves travelling through the finished composite armor panel during non destructive testing; thus the spacers will not appear as a fault in the armor panel during the testing. Next an uncured polyurethane resin is poured into the cavity formed by border 36 and sheet 10. This is typically was done under ambient conditions of pressure and at normal room temperatures, usually 60 to 80 degrees. It is preferred that the resin be water-like in fluidity and viscosity such that the resin flows easily into spaces 12 between tiles 28 and completely fill these spaces. It is possible to use resins having viscosity greater than water in their uncured state so long as the resin fills all of the spaces between tiles 28 before the resin finishes curing. We have used resins that cure at room temperature but heat-cured resins may used also. The cavity is filled to a slightly overflowed level; that is the level of uncured resin will be slightly (say, one or two millimeters) above spacers 38.

Before the resin cures, a heavy steel back plate 40 is placed over the array of tiles in the cavity, as shown in FIG. 7. Back plate 40 need not be of steel, but could be made of other metals, could be a composite armor plate, or could be comprised of any ballistically effective material or combination of materials. The edges of back plate 40 form a narrow circumferential gap 42 with border 36 so that as back plate 40 is forced down into position atop spacers 38, resin will escape through the gap. It is contemplated that the weight of back plate 40 will often suffice to force the plate into its intended position atop spacers 38. In addition to resin escaping through gap 42, resin will controlledly seep from the cavity through the interface between border 36 and sheet 10 until back plate 40 comes to rest on spacers 38. The purpose of overfilling the cavity with resin and then forcing resin out of the cavity through the sheet-border interface and through gap 42 is to assure that the spaces between tiles 28 are completely filled with resin. The advantage of gap 42 and the aforementioned interface is that they eliminate the need for special fluid escape ducts, conduits, or channels to be incorporated into back plate 40, sheet 10 or border 36. In a sense, the enclosure formed by sheet 10, border 36 and back plate 40 is a ductless enclosure, designated as 44 in FIG. 7.

The resin used is typically one that cures at ambient or room temperature, but resins that require oven curing may be used as well. Once the resin has cured, the armor panel is removed from enclosure 44 and flash formed in the aforementioned interface or in gap 42 is removed.

Various alterations and modifications will become apparent to those skilled in the art without departing from the scope and spirit of this invention and it is understood this invention is limited only by the following claims.

What is claimed is:

1. A method of fabricating a composite armor panel, comprising:
    providing an adhesive surface;
    placing a template on the adhesive surface, the template having walls defining regular polygonal pockets, the template having an L-shaped frame affixed along two edges of the template, one or more remaining edges of the template comprised of exposed pockets;
    fitting tiles closely in the pockets upon the adhesive surface;
    removing the template from the tiles so the tiles become free standing tiles having uniform spaces there among;
    placing a border on the adhesive surface around the tiles to define a cavity;
    placing spacers on the tiles;
    pouring resin into the cavity so that the spaces among the tiles are completely filled and the resin's level is above the spacers;
    placing a plate over the tiles, the plate forming a gap around itself with the border;
    passing excess resin through the gap until the plate rests on the spacers;
    curing the resin to form an elastomeric matrix embedding the tiles; and
    removing the border.

2. The method of claim 1 wherein:
    The border has a different degree of flatness than the adhesive surface whereby the border and the adhesive surface form a controlled seepage interface;
    the adhesive surface, the border and the plate define a ductless mold cavity;
    the method further includes using the plate to press the resin in the cavity to force excess resin from the cavity through the gap between the plate and the border and through the controlled seepage interface; and
    the excess resin exits the cavity until the plate contacts the spacers on the tiles.

3. The method of claim 2 wherein:
    the resin is poured at ambient pressure and at room temperature; and
    the resin in its uncured state has water-like viscosity.

4. A method of fabricating a composite armor panel having a tiled layer, a back plate and an elastomeric layer, comprising:
    providing an adhesive surface;
    placing a template on the adhesive surface, the template having walls of uniform thickness defining a compact arrangement of polygonal pockets, the template having an L-shaped frame affixed along two edges of the template, one or more remaining edges of the template being comprised of exposed pockets;
    fitting first tiles closely in the pockets in contact with the adhesive surface;
    removing the template from the first tiles so the first tiles become free standing tiles;
    replacing the template on the adhesive surface so that only some of the free standing tiles closely fit in the pockets;
    fitting other tiles closely in unoccupied pockets;
    removing the template so that all the tiles are free standing tiles having uniform spaces there among;
    repeating the steps of replacing the template, fitting the other tiles and removing the template until a final array of tiles is created;
    placing a border on the adhesive surface around the final array to form a cavity;
    placing spacers on the final array;
    pouring polyurethane resin into the cavity so that the spaces among the tiles of the final array are completely filled and the resin's level is above the spacers;
    placing the back plate over the final array, the back plate forming a gap around itself with the border;

passing excess resin through the gap until the back plate rests upon the spacers whereby a layer of resin is disposed between the final array and the back plate;

curing the resin to form an elastomeric matrix embedding the final array and bonding to the back plate; and removing the border.

5. The method of claim 4 wherein:

The border has a different degree of flatness than the adhesive surface whereby the border and the adhesive surface form a controlled seepage interface;

the adhesive surface, the border and the back plate define a ductless mold cavity;

the method further includes using the back plate to press the resin in the cavity to force excess resin from the cavity through the gap between the back plate and the border and through the controlled seepage interface; and the excess resin exits the cavity until the back plate contacts the spacers.

6. The method of claim 5 wherein:

the resin is poured at ambient conditions of temperature and pressure;

the resin in its uncured state has water-like viscosity; and the resin cures at room temperature.

7. The method of claim 6 wherein the adhesive surface is disposed on an armor plate.

8. A method of fabricating a composite armor panel having a tiled layer, a back plate and an elastomeric layer, comprising:

providing a precisely flat engagement element having an adhesive surface;

placing a template on the adhesive surface, the template having thin walls of precise, constant thickness defining regular polygonal pockets, the template having an L-shaped frame affixed only along two edges of the template so that one or more remaining edges of the template are comprised of exposed pockets;

fitting first tiles closely in the pockets in contact with the adhesive surface;

removing the template from the first tiles so the first tiles are free standing tiles;

replacing the template on the adhesive surface so that only some of the free standing tiles closely fit in the pockets;

fitting other tiles closely in unoccupied pockets;

removing the template from all the tiles so that all the tiles are free standing tiles having precisely wide spaces there among;

repeating the steps of replacing the template, fitting the other tiles and removing the template until a final array of tiles is created;

providing a border with a different degree of flatness from the engagement element and placing the border on the engagement element so as to form a controlled seepage interface there between, wherein the final array is surrounded by the border and is recessed relative to the border;

placing spacers on the final array chemically similar to a polyurethane resin such that the spacers within a body of the resin are indistinguishable from the resin during testing by ultrasonic waves transmitted through the body;

pouring the polyurethane resin, which has water-like viscosity in an uncured state, into the cavity so that the spaces among the tiles of the final array are completely filled and the resin's level is above the spacers;

after pouring the resin, placing a back plate over the final array, the back plate forming a gap around itself with the border, wherein the engagement element, the border and the back plate together form a ductless enclosure;

before the resin is completely cured, using the back plate to press upon the resin, passing excess resin through the controlled seepage interface and the gap until the back plate rests upon the spacers whereby a layer of resin is disposed between the final array and the back plate;

curing the resin at ambient temperature and pressure to form an elastomeric matrix embedding the final array and bonding to the back plate; and removing the border.

9. The method of claim 8 wherein the tiles in the final array have opposed faces precisely coplanar with a pair of parallel planes and sides of the tiles are perpendicular to the opposed faces.

10. The method of claim 9 wherein the engagement element is an armor plate.

* * * * *